United States Patent Office 2,941,555
Patented June 21, 1960

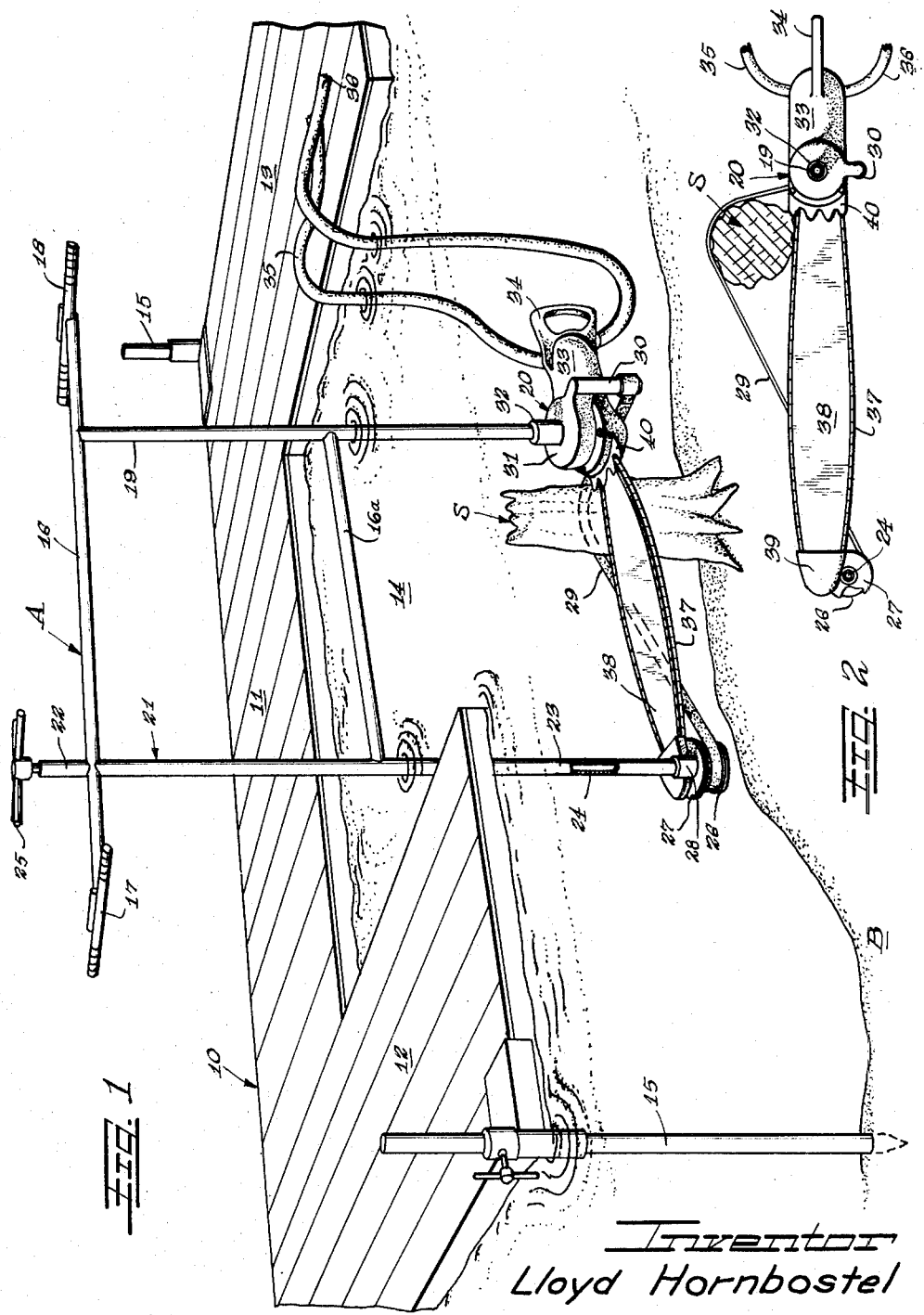

2,941,555

UNDERWATER SAW STRUCTURE

Lloyd Hornbostel, 1638 Emerson St., Beloit, Wis.

Filed Jan. 29, 1958, Ser. No. 711,911

3 Claims. (Cl. 143—32)

The present invention relates broadly to underwater saws, and is more particularly concerned with a new and improved chain saw construction for underwater use characterized by complete maneuverability from above the water level and freedom from support upon the river or lake bottom.

Briefly stated, the invention to be more fully described herein comprises in its preferred embodiment a rig formed of a horizontal supporting member from which depend a pair of spaced vertical members, one of which carries at its lower end an underwater chain saw of the type including a frame and saw chain trained therearound. A shaft is received within the other vertical member, and mounted at one end of the shaft beneath the chain frame is a pulley upon which is wound a belt or similar means to hold the saw in cutting engagement with the piling stump or the like. The belt is secured at its opposite end to a point adjacent the saw supporting vertical member, while the upper end of the shaft in the other vertical member carries a handle to wind the belt upon the pulley. To operate applicant's improved structure, the frame is lowered from a raft or other work platform into the water with the belt lapping a stump or the like and the saw frame on the opposite side of the stump. After engaging the saw guide teeth in the stump, the belt is tightened to bring the chain saw blade into cutting engagement with the stump at the selected location along the height thereof.

It is an important aim of the present invention to provide an underwater saw construction of relatively light weight which may be readily maneuvered into cutting engagement with a tree stump or the like free of support for said saw upon the lake or river bottom.

Another object of the invention is to provide a chain saw assembly for underwater use having means controllable from above the water level to locate and maintain the saw in cutting relation with respect to a tree stump or the like.

Another object of this invention lies in the provision of a supporting framework for an underwater saw, which includes adjustable belt means or the like engageable with a side of the stump opposite the saw to maintain said saw firmly against the stump, the belt means being positioned horizontally below the saw to assure that the saw will be maintained in proper cutting relation to the stump continuously during the entire cutting operation.

A further object of the present invention is to provide an underwater saw construction which is adapted for use by a minimum number of relatively unskilled personnel, and may be lowered to any desired depth from a position above the water level.

A still further object of the invention is to provide an adjustable chain or strap device for supporting an underwater saw in a preselected cutting position against tree stumps and the like, characterized by its ease of positioning upon the stump and its ready removal therefrom when desired, and which may be employed on stumps of varying heights and diameters.

Other objects and advantages of the present invention will become more apparent during the course of the following description, particularly when taken in connection with the accompanying drawings.

In the drawings, wherein like numerals are employed to designate like parts throughout the same:

Figure 1 is a perspective view of applicant's invention as typically employed in cutting a submerged stump from a raft; and Figure 2 is a sectional view of the improved structure.

Submerged tree stumps, pilings and similar objects which extend generally upwardly into the water a distance less than about three feet from the water level present hazards to both persons and property. Frequently such objects are not marked by flags or similar means, and vigorous contact with said objects by swimmers or boat users or other persons can frequently result in serious, if not fatal, injury to persons, as well as extensive damage to the boat or other water vehicle. An effective device of relatively simple construction to sever the tree stumps, pilings or other similar objects has been provided by applicant, and reference is now made to the drawings showing an improved form of the invention.

The underwater saw structure of this invention, designated in its entirety by the letter A, is particularly well adapted for use from a floating work platform such as a raft or barge. A raft 10 of generally U-shape configuration in plan is disclosed in the drawings; however, it will be appreciated that rafts of other shapes are suitable, as well as a barge having an opening in the bottom through which the saw structure A may be lowered and manipulated into cutting position. The raft 10 is provided with an end work platform 11 and side work platforms 12 and 13 between which is an open area 14 normally located above the stump S to be cut. To assure stability of the raft 10 during the stump cutting operation, there may be provided at the corners of the raft vertically adjustable anchor posts 15, extending a short distance into the river or lake bed B.

The underwater saw structure A is formed to include a generally horizontal bar member 16 having at its opposite ends handles 17 and 18. Spaced inwardly from the end of the tubular bar 16 carrying the handle 18 is a vertical leg member 19. The leg 19 may be secured at one end to the bar 16 by welding or other suitable means, and carries at its opposite end the saw assembly 20 to be described in greater detail later. Located inwardly of the handle end 17 of the bar member 16 is a vertical leg member 21 arranged in generally parallel relation to the vertical leg 19. A bracing member 16a may be provided between the leg members 19 and 21; however, this may not at all times be required. The leg member 21 may be formed in two sections, upper portion 22 and lower portion 23, each of which is of tubular construction. The upper and lower portions 22 and 23 of the leg member 21 may be welded or otherwise secured at their opposite ends to the bar member 16.

Received within the tubular leg member 21 and extending therethrough is a shaft 24 carrying a handle 25 at its upper end and a pulley 26 at its lower end. The pulley 26 may be rotatable within a frame or shell 27 secured to the leg member 21 by means of a collar 28. Suitably attached to and trained around the pulley 26 is the saw supporting means 29, shown in the drawings to be in the form of a belt. The belt is desirably of a relatively wide and strong canvas material to prevent sagging and to assure proper support for the saw assembly 20. However, experience to date has shown that a three-strand roller chain is also very suitable for this purpose, and effective results will also be obtained with a silent chain or a heavy-duty type ladder chain. Further, a series of connected links secured at one end of the series to one of the vertical members and at its opposite end by a chain which may be wound around a pulley adjacent the end of the saw frame may be used, as well as a horizontally swingable bar geared at one end and controllable from the work platform. As used in the specification and claims, the expressions "band" and "saw supporting means" are intended to cover the devices mentioned and all equivalents thereof.

The opposite end of the belt or saw-supporting means 29 is fixed at a point adjacent the lower end of the vertical leg 19, and one manner in which this may be accomplished is by the provision of a vertical extension 30 mounted on the pneumatic mechanism housing 31 of the saw assembly 20. As noted, the saw assembly 20 is carried by the vertical leg 19, and an effective means for securing the saw assembly 20 to the leg 19 is by means of a collar 32 welded at opposite ends to the pneumatic housing 31 and leg member 19. The saw assembly 20 may be of any suitable type available on the market for underwater use, and units marketed by the Mall Company, Inc. of Chicago, Illinois have proven quite satisfactory in practice. The unit shown comprises a head portion 33 and handle 34, and connected to the saw assembly are inlet and outlet hoses 35 and 36, respectively, to supply and exhaust compressed air from the driving mechanism for a saw chain 37 trained around a frame 38. A protective cover 39 is provided around one end of the chain saw frame 38, and said cover may be welded or otherwise secured to the pulley frame 27 to furnish additional support for the saw assembly 20. As available to the trade, the saw assembly 20 further includes a saw guide member 40 of toothed configuration to initially engage the stump S to be cut, and provide a fulcrum point about which the saw chain and frame may travel during the cutting operation.

The operation of applicant's invention may be described as follows. After mooring the raft 10 with the open area 14 thereof generally above the stump S to be cut, a person at each end of the bar member 16 may grasp the handles 17 and 18 and lower the saw structure A generally vertically downwardly with the strap or other saw supporting device 29 in a released condition. The strap 29 is then caused to be looped around one side of the stump S and the saw frame 38 on the opposite side of said stump. By movement of the handles 17 and 18, the saw structure A is moved in a generally oblique direction with respect to the stump to force one of the teeth of the saw guide member 40 of the saw assembly 20 into the side of said stump S. The handle 25 on the shaft 24 is then rotated clockwise as viewed in Figure 1 to tighten the strap or belt 29 about the stump S and thereby draw the saw frame and chain trained thereabout into firm contact with said stump. With the stump essentially surrounded by the saw chain 37 and strap 29, as well as receiving therein one of the teeth of the saw guide member 40, compressed air is directed from a source through the inlet hose 35 to the saw assembly mechanism to cause travel of the saw chain 37 about the saw frame 38. During the cutting operation the entire saw structure A will rotate clockwise to a moderate degree as the saw chain penetrates the stump S and completes the cut therethrough.

It may be seen from the foregoing that the saw structure A of applicant's invention is moved into cutting relation with respect to a stump or the like by control means which are directed entirely from a position above the water level. Further, it is not required in the operation of applicant's structure that the underwater saw mechanism be supported in any manner upon the river or lake bed as has been the practice in the past. The structure A may be lowered to any desired depth by direction from above the water level, and a stump, piling or any other similar object sawed off to the desired height beginning from a height closely adjacent the river or lake bed up to the top portion of said submerged object. Accordingly, by use of the arrangement herein disclosed it is not necessary that divers descend and position the underwater saw in proper cutting relation with respect to the object to be severed, since by use of the structure herein disclosed, the entire positioning and cutting operation can be performed from a raft, barge or similar water vehicle. It is to be additionally noted that the band or other saw-supporting means 29 is located in a horizontal plane beneath the plane of the saw frame 38, and thereby a firm support for the saw assembly 20 is provided throughout the entire cutting operation until the stump S or other object is completely severed. The structure of this invention is also of relatively simple and light construction, and permits cutting of stumps and other objects with a minimum of personnel in a relatively short period of time.

It is to be understood that the form of the invention herein disclosed and described is to be taken as the preferred embodiment of the same, and that various changes in the size, shape and arrangement of parts may be undertaken without departing from the spirit of the invention or the scope of the subjoined claims.

I claim as my invention:

1. Saw apparatus for underwater work controllable from above water and free of contact with the bed of the body of water in which an object to be cut is located, comprising a horizontal support and spaced leg members extending downwardly from said support to be raised and lowered by said support free of sliding guidance along said object to position the lower end of said leg member upwardly spaced from said bed, a saw unit carried at the lower end of one of the leg members and having a horizontal cutting portion located on one side of the object to be cut, a shaft received within the other leg member and supporting pulley means at the lower end thereof, a band for supporting the saw cutting portion in firm cutting relation to the object to be cut, said band being attached at one end to the pulley means and at its opposite end to a point adjacent the lower end of the saw supporting leg member and extending around the opposite side of the object to be cut along a line below the saw cutting portion, and means at the upper end of the shaft for rotating said shaft and pulley to tighten and loosen the band and thereby engage or release the saw cutting portion from supported engagement with the object to be cut.

2. Saw apparatus for underwater work controllable from above water and free of contact with the bed of the body of water in which an object to be cut is located, comprising a horizontally arranged support member, a pair of vertical leg members located inwardly from opposite ends of the horizontal member and depending downwardly therefrom to be raised and lowered by said support member free of sliding guidance along said object, the lower ends of the leg members being normally spaced upwardly from the river or lake bed supporting the object to be cut, a saw unit carried at the lower end of one of the leg members and having a cutting portion located on one side of the object to be cut, a shaft received within the other leg member, pulley means carried at the lower end of said shaft, a band for supporting the saw cutting portion in firm cutting relation to the object to be cut, said band being attached at one end to the pulley means and at its opposite end to a point adjacent the lower end of the saw supporting leg member and extending around the opposite side of the object to be cut along a horizontal line below the saw cutting portion, and wheel means at the upper end of the shaft for rotating said shaft and pulley to tighten and loosen the band and thereby engage or release the saw cutting portion from supported engagement with the object to be cut.

3. An underwater chain saw to be controlled from above water free of contact with the bed of the body of water in which an object to be cut is located, which comprises an upright frame to be raised and lowered to the desired cutting height free of sliding guidance along the object to be cut, a chain saw mounted on the lower portion of said frame and spanning the frame to present the chain saw blade thereof along a substantially horizontal cutting run, a motor on said chain saw for driving the saw blade, teeth on said chain saw adjacent the motor end thereof for biting into an object to be sawed and accommodating the rocking of the saw blade into the object, a flexible strap mounted on the lower end of said frame below the chain saw and spanning the lower end of the frame, a pulley on the lower end of said frame for winding the strap therearound, and means actuated from the upper portion of the frame for rotating said pulley to tighten the strap and pull the chain saw blade into the object to be cut while pivoting the chain saw about a tooth engaged in said object.

References Cited in the file of this patent

UNITED STATES PATENTS

| | | |
|---|---|---|
| 1,979,001 | Kankos | Oct. 30, 1934 |

FOREIGN PATENTS

| | | |
|---|---|---|
| 49,816 | Netherlands | Jan. 15, 1941 |
| 740,210 | Germany | Oct. 14, 1943 |
| 937,439 | Germany | Jan. 5, 1956 |